United States Patent
Sands

(10) Patent No.: US 10,882,758 B2
(45) Date of Patent: Jan. 5, 2021

(54) WASTE STREAM DECONTAMINATION SYSTEM

(71) Applicants: SANDYLAKES LIMITED, Hong Kong (CN); Bruce Keith Sands, Berkeley Vale (AU)

(72) Inventor: Bruce Keith Sands, New South Wales (AU)

(73) Assignees: SANDYLAKES LIMITED, Hong Kong (CN); Bruce Keith Sands, Berkeley Vale (AU)

(*) Notice: Subject to any disclaimer, the term of this patent is extended or adjusted under 35 U.S.C. 154(b) by 99 days.

(21) Appl. No.: 16/083,502

(22) PCT Filed: Mar. 8, 2017

(86) PCT No.: PCT/AU2017/050205
§ 371 (c)(1),
(2) Date: Sep. 8, 2018

(87) PCT Pub. No.: WO2017/152229
PCT Pub. Date: Sep. 14, 2017

(65) Prior Publication Data
US 2019/0071321 A1  Mar. 7, 2019

(30) Foreign Application Priority Data
Mar. 8, 2016 (AU) ................... 2016900851

(51) Int. Cl.
*C02F 1/40* (2006.01)
*C02F 1/00* (2006.01)
(Continued)

(52) U.S. Cl.
CPC .............. *C02F 1/001* (2013.01); *C02F 1/28* (2013.01); *C02F 1/285* (2013.01); *C02F 1/286* (2013.01);
(Continued)

(58) Field of Classification Search
None
See application file for complete search history.

(56) References Cited

U.S. PATENT DOCUMENTS 3,764,008 A * 10/1973 Darley .................. C10G 1/045
                                              210/704
5,110,785 A *  5/1992 Reed ....................... B01J 20/24
                                              502/404
(Continued)

FOREIGN PATENT DOCUMENTS

CN        100528282 C     8/2009
CN        201713393       1/2011
(Continued)

OTHER PUBLICATIONS

Australian International Search Report dated Apr. 8, 2016 for PCT Application No. 2016900851.
(Continued)

*Primary Examiner* — Chester T Barry
(74) *Attorney, Agent, or Firm* — Moser Taboada

(57) ABSTRACT

The invention provides a method of decontaminating a waste stream liquid of solid particulate and one or more other pollutants, the method comprising the steps of: (i) removing solid particulate contaminant from the waste stream liquid by passing the waste stream liquid through at least one solids trap into a waste stream liquid holding reservoir whereby solid particulate is retained in the at least one solids trap; and (ii) removing one or more other pollutants from the waste stream liquid in the reservoir by contacting the waste stream liquid with at least one contaminant trap whereby the contaminant trap sequesters the one or more other pollutants within the contaminant trap.

24 Claims, 2 Drawing Sheets

(51) Int. Cl.
*C02F 1/28* (2006.01)
*E03F 5/16* (2006.01)

(52) U.S. Cl.
CPC .................. *C02F 1/40* (2013.01); *E03F 5/16* (2013.01); *C02F 2307/08* (2013.01)

(56) References Cited

U.S. PATENT DOCUMENTS

| | | | |
|---|---|---|---|
| 5,120,435 | A | 6/1992 | Fink |
| 7,967,985 | B1 | 6/2011 | Parjus et al. |
| 2005/0072738 | A1* | 4/2005 | Weir .......................... E03F 1/00 210/691 |
| 2007/0251879 | A1* | 11/2007 | Batten .................... B01D 21/02 210/532.1 |
| 2009/0137384 | A1* | 5/2009 | Katay ...................... C02F 1/281 502/172 |
| 2010/0326899 | A1 | 12/2010 | Ennis |

FOREIGN PATENT DOCUMENTS

| | | |
|---|---|---|
| CN | 201713393 U | 1/2011 |
| CN | 202740826 | 2/2013 |
| GB | 2245609 | 1/1992 |
| WO | WO-1996001157 A1 | 1/1996 |
| WO | WO-2005097287 A1 | 10/2005 |

OTHER PUBLICATIONS

International Search Report dated May 15, 2017 for PCT Application No. PCT/AU2017/050205.

* cited by examiner

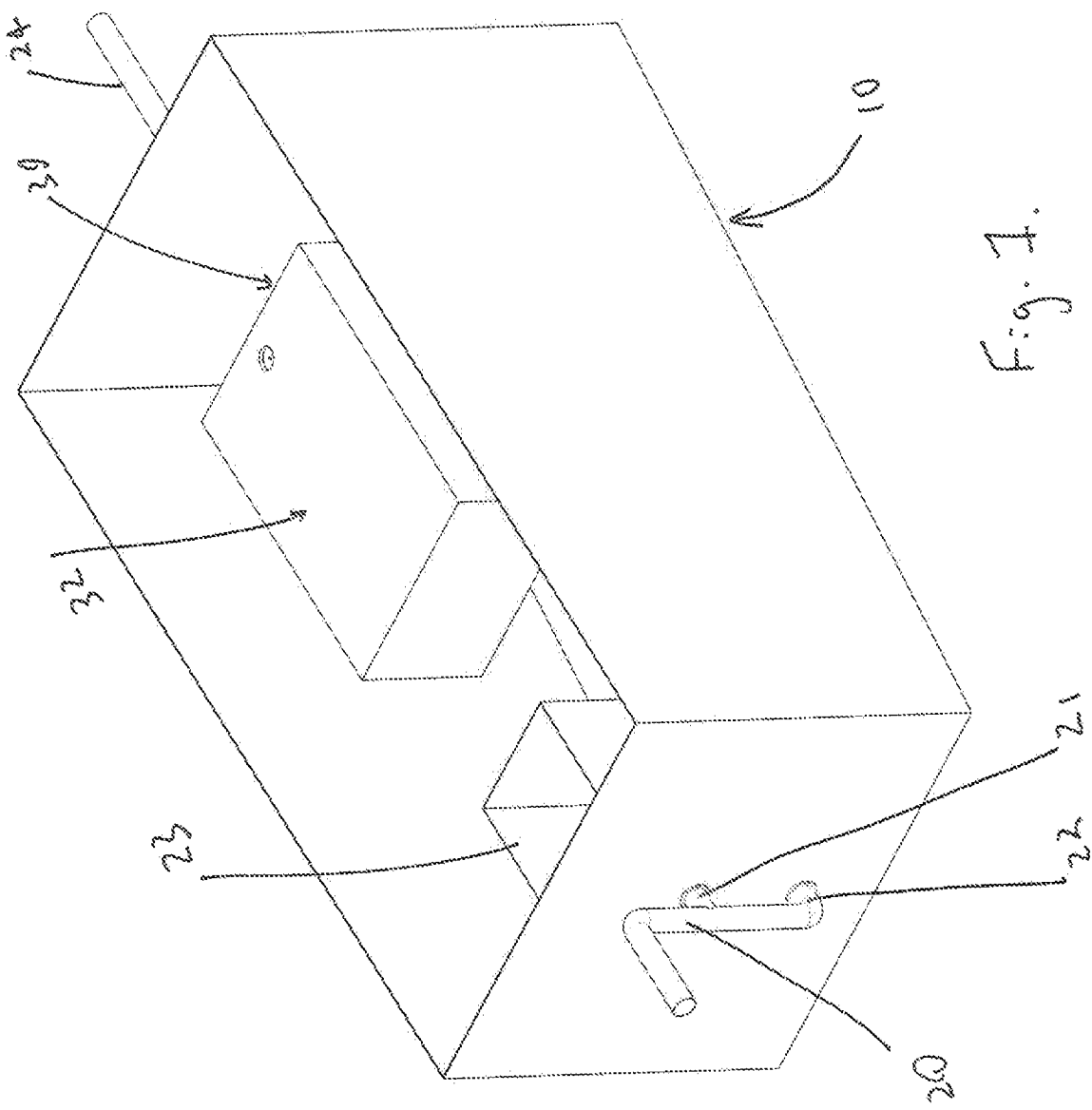

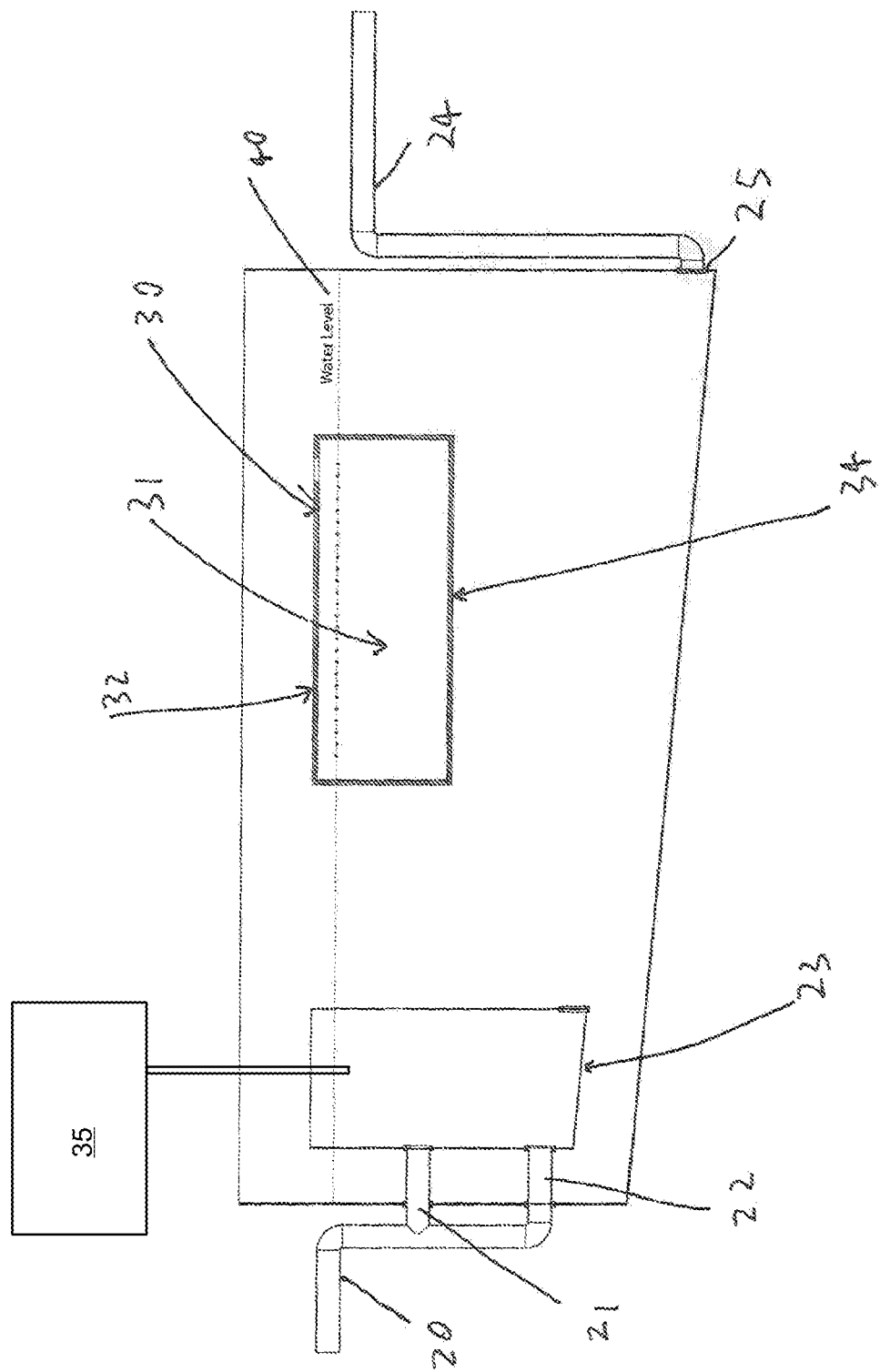

WASTE STREAM DECONTAMINATION SYSTEM

FIELD OF THE INVENTION

The invention relates to a waste stream decontamination system, more particularly, a waste water treatment apparatus, and methods for using same, particularly, for the treatment of water and other waste streams to remove solids, and pollutants such as soluble and insoluble inorganic, organic and microbial pollutants, including hydrocarbon based pollutants, for example, fats, oil, and/or grease contaminants.

BACKGROUND

Water remediation to remove (hydrocarbon based) pollutants from water waste is costly and often requires application of a range of biological, chemical and physical treatment processes, including expensive and time consuming chemical, microbial, enzymatic treatment while physical treatment processes include gravity separation, gas flotation, cyclonic separation, filtration and/or centrifuge separation techniques.

Sources of pollutants, including hydrocarbon based pollutants, in waste streams arise from hospitals, laboratories, and certain industrial processing plants. However, hydrocarbon contamination is particularly evident in sewage water from restaurants, commercial kitchens, fast food outlets, and the like, which typically comprise fats, oils and/or grease from food preparation, cooking and clean-up processes, as well as particulate solid food waste including burnt or charred food waste.

Many of the fats, oil and/or grease from food related sources have low melting points and thus tend to solidify and coagulate with solid waste materials at cold water temperatures, and can form large foul smelling and unsanitary masses of insoluble fats known as fatbergs. Preventing and treating sewer damage caused by such fatbergs, as well as removing blockages to a mains sewage system places a significant cost burden on water/sewage authorities.

In an effort to reduce such contaminants entering groundwater and/or the water network, commercial businesses are required to install, maintain and service a suitably sized grease trap or grease inceptor in an effort to control the levels of such contaminants entering sewage waste and ultimately water treatment facilities. These grease traps are typically positioned underground in the vicinity of the establishment's drain outlet and intermediate of the sewer mains connection. Existing grease traps are inefficient and compliance by the business owner with maintenance schedules is essential to avoiding excess contaminants entering the water network. While environmental water standards relating to biological oxygen demand (BOD), total dissolved solids (TDS) and fats, oil and grease (FOG) content exist in relation to waste water, enforcement of these standards is a major issue and poor quality waste streams comprising contaminants from commercial grease traps are commonplace. This places a significant burden on water treatment facilities as well as the risk of fines and/or penalties against the business owners.

Conventional grease traps are relatively simple passive containment devices designed to contain and deal with a predetermined volume of contaminated water arising from a commercial source. Current grease traps utilise waste water holding reservoirs designed to retain waste water/waste streams containing fats, oils and grease for sufficient periods to allow solid residues to settle and the hydrocarbon waste to rise to the surface of the reservoirs where it is held in place away from sewer drain by relatively simple baffle systems. The baffle arrangement reduces turbulent fluid flow through the trap thereby allowing the solids contaminant material to sediment to the bottom of the trap, while allowing fat, oil and grease flows towards the top of the reservoir away from the trap drain locations. During normal use, after a waste stream residence period has expired, relatively sediment and hydrocarbon free water flows from the trap via an outlet positioned away from the fats, oil and grease which tend to settle around the baffles. As explained above, to avoid overflow of the solids and fats, oil and grease, the entire contents of the trap must be regularly pumped out by waste disposal operators to remove the solids, fats, oil and grease together with the aqueous contents of the trap which is transported to landfill, soil injection or is used as mulch. Existing grease traps are not efficient enough to capture all, or substantially all, of the solids and fats, oils and grease waste present in a waste stream. Thus, there is a risk that a significant quantity of the pollutants may pass through the water network and end up in the ocean.

Periodic drainage of a grease trap using vacuum suction is carried out by specialist service providers who remove and transport the contents of the trap for disposal. As a result of the high volumes of mixed waste involved, associated transport, disposal and landfill, costs are high and the waste products tend to be toxic and are not typically recyclable. For the most part, such waste ends up in landfill. Even with regular trap drainage and maintenance, the difficulties associated with proper trap cleaning means water treatment plants bear a high burden dealing with waste streams arising from grease traps. It is clear that regular drainage of conventional grease traps required to ensure a reasonable quality of water waste going to water treatment facilities is an expense born by the business owner. In practice, there are often compliance issues which taken with accidental spill off from poorly maintained commercial grease traps results in increased infrastructure maintenance and treatment costs for local authorities.

Furthermore, as conventional grease traps are typically installed underground, complete clean out as well as retrofitting of older traps to increase efficiency is costly and as a result there has been a low uptake of improved technologies.

Therefore, improved waste stream decontaminant systems, and in particular grease traps and grease trap cleaning technologies are highly desirable.

Any discussion of the prior art throughout the specification should in no way be considered as an admission that such prior art is widely known or forms part of common general knowledge in the field.

It is an object of the present invention to overcome or ameliorate at least one of the disadvantages of the prior art, or to provide a useful alternative.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

SUMMARY OF THE INVENTION

In a first aspect, the invention provides a system for servicing a grease interceptor for decontaminating a waste stream liquid of solid particulate and one or more hydrocarbon pollutants, the system comprising:

a grease interceptor comprising:

at least one reservoir for waste stream to be decontaminated, the reservoir having at least one inlet for receiving the waste stream into the reservoir and at least one outlet for removal of decontaminated waste stream from the reservoir;

at least one solids trap in direct fluid communication with the at least one inlet for separating solid particulate material from the received waste stream before the waste stream enters into the reservoir;

at least one hydrocarbon contaminant trap for removing the one or more hydrocarbon pollutants from the waste stream received into the reservoir, wherein the hydrocarbon contaminant trap is configured to sequester one or more hydrocarbon pollutants therein; and a vacuum means suitable for removing the separated solid particulate material and the hydrocarbon contaminant trap in substantially drained form.

In a second aspect, the invention provides a method of servicing a grease interceptor for decontaminating a waste stream liquid of solid particulate and one or more hydrocarbon pollutants in a grease interceptor, using a system according to the invention, wherein servicing the grease interceptor involves the step of:

removing the solid particulate material and the sequestered hydrocarbon pollutant from the at least one respective traps in substantially drained form by mechanical or manual means involving the vacuum means; and optionally, returning new and/or recycled hydrocarbon contaminant trap to the reservoir.

In a third aspect, the invention provides a method of decontaminating a waste stream liquid of solid particulate and one or more hydrocarbon pollutants in a grease interceptor, the method comprising the steps of:

(i) removing solid particulate from the waste stream liquid by passing the waste stream liquid through at least one solids trap into a single chamber waste stream liquid holding reservoir, wherein the solids trap is provided in the direct path of the waste stream as it enters the reservoir such that the waste stream liquid flowing through the at least one inlet of the reservoir flows through the solids trap prior to discharge into the reservoir, whereby solid particulate is retained in the at least one solids trap such that the waste stream liquid entering the reservoir for further treatment is substantially particulate free;

(ii) removing one or more hydrocarbon pollutants from the waste stream liquid in the reservoir by contacting the waste stream liquid with at least one hydrocarbon contaminant trap whereby the hydrocarbon contaminant trap sequesters the one or more other pollutants within the contaminant trap;

wherein the interceptor is configured such that the separated solid particulate material and the sequestered hydrocarbon pollutant is removable from the at least one respective traps in substantially drained form by mechanical or manual means involving a vacuum.

In a fourth aspect, the invention provides a solid particulate material and/or pollutant material obtained by a method according to the invention, preferably when used in an agricultural application and/or as a combustible solid fuel for power generation and/or use of the recovered hydrocarbon material of a method of the invention in a biodiesel application or as fuel or a feedstock for the production fuel such as biodiesel.

In a fifth aspect, the invention provides a kit for retrofitting a waste stream decontamination system for use with the system according to the invention, the kit comprising:

(i) at least one solids trap in accordance with the invention, and (ii) at least one contaminant trap in accordance with the invention, and optionally instructions for retrofitting the waste stream decontamination system.

In a sixth aspect, the invention provides a solid trap and/or a contaminant trap comprising at least one one-way valve when used in a method according to the invention.

In a seventh aspect, the invention provides for a use of one or more contaminant traps in system for decontaminating waste stream of solid particulate and one or more pollutants according to the invention, preferably hydrocarbon based pollutants, from a waste stream entering a grease interceptor.

In an eighth aspect, the invention provides for the use of a waste stream decontamination system as defined in the invention in a method of servicing a grease interceptor.

In a ninth aspect, the invention provides a grease interceptor adapted for use in a system according to the invention.

Also described herein is a method of decontaminating a waste stream liquid of solid particulate and one or more other pollutants, the method comprising the steps of:

(i) removing solid particulate contaminant from the waste stream liquid by passing the waste stream liquid through at least one solids trap into a waste stream liquid holding reservoir, whereby solid particulate is retained in the at least one solids trap; and (ii) removing one or more other pollutants from the waste stream liquid in the reservoir by contacting the waste stream liquid with at least one contaminant trap, whereby the contaminant trap sequesters the one or more other pollutants within the contaminant trap.

After the solid particulate and one or more other pollutants have been removed from the waste stream, the waste stream is in a substantially less polluted form, whereby at least one of the solids and the one or more other pollutants are reduced in amounts compared to the waste stream liquid prior to treatment with the methods of the invention. In such a case, the waste stream liquid will be understood to be a decontaminated waste stream liquid.

Desirably, the waste stream liquid is, for example, a waste water run off, for example, from an industrial plant, such as a chemical manufacturing, processing or treatment plant including plastics plant, a pharmaceutical, pesticide or herbicide plant, domestic, industrial, commercial facilities, including restaurants, food preparation and/or businesses, agriculture, sewers and stormwater.

In one embodiment, the one or more other pollutants include inorganic based pollutants, organic based pollutants, microbial pollutants, and combinations thereof. It will be appreciated that inorganic based pollutants include heavy metals, such as cadmium, mercury, lead, and arsenic; inorganic sulfides, such as hydrogen sulfide; inorganic acids such as sulphuric acid, silicon based pollutants, etc. It will be further appreciated that organic pollutants include organic compounds including organic acids, ethers, esters, ketones, organic salts, etc., hydrocarbon based pollutants including fats, oils, greases, petroleum compounds including volatile organic compounds such as benzene, xylene, toluene, etc., pesticides; herbicides; drug actives and/or metabolites, dissolved gases such a methane. Accordingly, the present invention may be useful for implementation in, for example, water, sewage and waste water treatment plants, liquid treatment plants, lift stations, oily water separators, oily water interceptors, grease processing plants, fat processing plants, food production plants and facilities, tallow plants, etc.

Suitably, the waste stream comprises one or more of solid particulate material and one or more pollutants, suitably hydrocarbon based pollutants. Typically, the hydrocarbon based pollutants are fats, oil and/or grease contaminants. Waxes may also be present in some waste streams. Particularly preferred hydrocarbon based pollutants are those arising from food, food preparation, cooking or clean up sources as described elsewhere herein. Typically such hydrocarbon based pollutants include vegetable and/or other cooking oils, animal fats and/or other cooking fat, oil and/or grease. Mixtures of such hydrocarbon based pollutants which can be liquid and/or solid at operating temperatures are also encompassed by the present invention. Most preferably, the methods of the invention relate to decontaminating waste stream liquid comprising hydrocarbon based pollutants, such as fats, oils and grease from a cooking, food preparation and/or clean up source. Suitably, the reservoir is a reservoir/interceptor of a grease trap, preferably of the single chamber type, where all decontamination steps take place in the same chamber of the reservoir.

Also described herein is a method of decontaminating a waste stream liquid of solid particulate and one or more hydrocarbon based pollutants, the method comprising the steps of:

(i) removing solid particulate contaminant from the waste stream liquid while filling a waste stream liquid holding reservoir by passing the waste stream liquid through at least one solids trap into the reservoir whereby solid particulate is retained in the at least one solids trap; and (ii) removing one or more hydrocarbon based pollutants from the waste water liquid in the reservoir by contacting the waste water liquid with at least one contaminant trap whereby the contaminant trap sequesters the one or more hydrocarbon based pollutants within the contaminant trap.

One advantage associated with the methods and system of the invention is the associated greater efficiency in ensuring that solids, and one or more other pollutants of interest do not enter the water network compared with known systems.

Preferably, the method further comprises the step of allowing decontaminated waste stream to leave the reservoir to pass, for example, to a further treatment facility, or a sewer or water network.

It will be understood that the waste stream liquid entering the reservoir through the one or more solids trap comprises a reduced amount of solid particulate compared to the waste stream liquid entering the at least one solids trap.

Suitably, the contaminant trap comprises one or more sorbent materials capable of sequestering, for example, by adsorption and/or absorption or other association, one or more of the other pollutants from the waste stream. In a preferred embodiment, the contaminant trap consists of, or comprises, one or more sorbent materials capable of sequestering, for example, by adsorption and/or absorption or other association, one or more of the pollutants from the waste stream liquid. Furthermore, after contact with the one or more contaminant traps, the treated or decontaminated waste stream comprises a reduced amount of pollutants compared to the waste stream liquid entering the reservoir from the one or more solids traps. Furthermore, after contact with the contaminant trap, the treated waste stream liquid comprises a reduced amount of pollutants compared to the waste stream liquid entering the reservoir from the contaminant trap.

In one embodiment, the contaminant trap is one or more pollutant sorbing materials alone, which may be simply provided to the reservoir. For example, the pollutant sorbing material may be a particulate material that can be scattered on the surface of the fluid in the reservoir of the decontamination system. It may float on the waste stream liquid in the reservoir. In this case, it will be understood that pollutant sorbing material is in substantially loose or unbound form. It follows that pollutant sorbing material will have a degree of buoyancy in the waste stream liquid such that the material resides substantially on or at the surface of the waste stream liquid or no more than at least partially submerged in the waste stream liquid. In another embodiment, the contaminant trap is a container or receptacle comprising one or more pollutant sorbing materials, whereby the container or receptacle comprising sorbent material may be provided to the reservoir.

Where the one or more pollutants comprise one or more hydrocarbon based pollutants, the contaminant trap is preferably a hydrocarbon contaminant trap.

Suitably, the method further comprises removing the solids trap and/or the solid particulate contaminant in the solids trap from the reservoir to facilitate removal of the solid particulate from the trap. Preferably, after emptying, the method involves returning the one or more solids traps to the reservoir. Preferably, the removing step involves draining the waste stream liquid from the one or more solids traps thereby allowing solid particulate retained in the one or more solids trap to be removed from the solids traps in a waste stream liquid drained form. After such removal, the method preferably then further comprises the step of returning the one or more solids traps to the reservoir for a subsequent round of decontamination. In another embodiment, the method involves leaving the solids trap in position within the reservoir and removal of the solid particulate contaminant from the reservoir by other means, for example, manually such as by hand, and/or mechanically. In a preferred embodiment, the solid particulate removing step may be carried out by a vacuum or suction device or other means for providing a vacuum that is suitable for removing the solid particulate and/or sequestered pollutant from the reservoir.

Preferably, the method further comprises the step of removing the contaminant trap and/or the pollutant sequestered by, and/or in, the contaminant trap, from the reservoir to facilitate emptying of the sequestered pollutants from the contaminant trap. Preferably, after emptying, the method involves returning the contaminant trap to the reservoir. Preferably, the removing step involves draining waste stream from the contaminant trap thereby allowing the sequestered pollutants to be removed from the contaminant trap in a waste stream liquid drained form. Preferably, the method further comprises the steps of removing the drained sequestered pollutants from the contaminant trap and returning the contaminant trap to the reservoir. In another embodiment, the method involves leaving the contaminant trap in position within the reservoir and removing the sequestered pollutant from the contaminant trap by other means, for example, manually, for example, by hand, and/or mechanically. In a preferred embodiment, removing the sequestered pollutant may be carried out by a vacuum or suction device or other means for providing a vacuum that is suitable for removing the solid particulate and/or sequestered pollutant from the reservoir.

Suitably, the vacuum means is adapted to remove the separated solid particulate material and the sequestered hydrocarbon pollutant in substantially drained form. More suitably still, the removed solid particulate and the removed sequestered hydrocarbon pollutant is removed in substantially drained form by mechanical or manual means involves applying the vacuum means to the traps through one or more openings provided in the reservoir roof.

Preferably, at the time of removal the sequestered pollutant is in substantially drained form. Advantageously, removal in substantially drained form means that reduced amounts of waste stream liquid are concurrently removed from the reservoir. Thus it will be understood that during servicing the solids particulate material and the hydrocarbon pollutants are removed from the reservoir in a substantially drained form without draining the reservoir entirely of waste stream liquid. Furthermore, during operation and servicing, the waste water stream continuously flows into and out of the reservoir.

Thus, in one preferred embodiment the system and method of the invention provides a more efficient means of separating and removing both solids and or more other pollutants from a waste stream liquid than a convention baffle/sedimentation based system that operates on the principle of gravity separation and which typically required complete drainage of the reservoir to facilitate pollutant removal. Undesirably, significant volumes of waste stream liquid are removed from the reservoir in these known systems. Thus removal of the one or more pollutants from the contaminant trap may conveniently occur in substantially waste stream liquid free form and/or waste stream liquid drained form and represents an improvement over prior art methods as significantly reduced volumes of liquid waste are generated and each category of contaminant, solid and other pollutants, are separated, segregated and respectively removed in substantially drained form. Thus the efficiency of waste management and waste stream treatment system reservoir/interceptor servicing is improved. This is because the total volume of waste removed from the system on servicing is significantly reduced compared to that for conventional grease traps and equivalent waste stream treatment systems in which the entire contents of the system are necessarily removed together. Furthermore, the mixed nature of the waste recovered means that oftentimes it is unsuitable for further use/application and must be sent directly to landfill.

In use, the solids and/or contaminant trap contacts the waste stream liquid, and in one embodiment are preferably at least partially submerged in waste stream liquid in the reservoir. Preferably, in the method of the invention, the waste stream liquid is drained from the solids and/or contaminant trap by raising the solids and/or contaminant trap out of the reservoir and/or by lowering a liquid level of waste stream liquid in the reservoir to a level below the contaminant trap.

The solids and/or contaminant trap can be raised out of the reservoir by manual and/or mechanical means. Where manual means are used, a hand operated tool or implement for lifting is preferably used.

Also described herein is a method of decontaminating waste stream liquid of solid particulate and one or more hydrocarbon based pollutants, the method comprising the steps of:

(i) arranging at least one solids trap and at least one contaminant trap in a waste stream liquid holding reservoir in a configuration within the reservoir such that when the reservoir is filled to an operating level with waste stream liquid, the at least one contaminant trap is in contact with the waste stream liquid;

(ii) generating a substantially solid particulate-free waste stream liquid by passing the waste stream liquid through the solids trap into a waste stream liquid reservoir;

(iii) generating a substantially hydrocarbon based pollutant-free waste stream liquid in the reservoir by contacting the substantially solid particulate-free waste stream liquid with the at least one contaminant trap to sequester the one or more hydrocarbon based pollutants within the contaminant trap;

(iv) draining waste stream liquid from the contaminant trap to generate sequestered hydrocarbon based pollutants that are drained of waste stream liquid.

In one embodiment, the step of draining waste stream liquid from the contaminant trap to generate sequestered hydrocarbon based pollutants that are drained of waste stream liquid involves removing the at least one solids trap and/or the particulate material from the at least one solids trap Desirably, the method further comprises the step of removing the waste stream liquid drained sequestered hydrocarbon based pollutants from the contaminant trap and the reservoir.

Also described herein is a method of decontaminating waste stream liquid of solid particulate and one or more hydrocarbon based pollutants, the method comprising the steps of:

(i) arranging at least one solids trap and at least one hydrocarbon trap in a waste stream liquid holding reservoir in a configuration within the reservoir such that when the reservoir is filled to an operating level with waste stream liquid, the at least one hydrocarbon trap is in contact with the waste stream liquid;

(ii) generating a substantially solid particulate-free waste stream liquid while filling the reservoir by passing the waste stream through the solids trap into the reservoir;

(iii) generating a substantially hydrocarbon-free waste stream liquid in the reservoir by contacting the substantially solid particulate-free waste stream liquid with the at least one hydrocarbon trap to sequester the one or more hydrocarbon based pollutants within the hydrocarbon trap;

(iv) draining waste stream liquid from the hydrocarbon trap by removing the at least one solids trap and/or the particulate material from the at least one solids trap to generate sequestered hydrocarbon based pollutants that are drained of waste stream liquid; and (v) removing the waste stream liquid drained sequestered hydrocarbon based pollutants from the hydrocarbon trap and the reservoir.

It will be understood that the waste stream liquid, after being treated using the methods of the invention, has been decontaminated and comprises less solid particulate and less one or more other pollutants than the waste stream liquid prior to treatment. Therefore, substantially solid particulate-free waste stream liquid and/or substantially solid particulate-free waste stream liquid are waste stream liquids that comprise less solid particulate and less one or more other pollutants than present in the waste stream liquid prior to treatment.

In a preferred embodiment, there is provided a method relating to decontaminating a waste stream liquid of food and/or cooking originating solid particulate and one or more food and/or cooking originating fats, oil and/or grease contaminants. In such an embodiment, the contaminant trap is a fat, oil and/or grease trap. It will be understood that in this embodiment the decontaminant system is a grease trap/interceptor. The present process allows a reduction in the amount of waste stream liquid collected and disposed by, in particular, commercial grease trap maintenance operators. This reduction is achieved by the selective removal of solid waste with reduced pollutant levels, as well as separation of fats, oils and grease in preference to waste stream liquid collection.

In a preferred embodiment, the method of the invention further comprises the step of inputting a predetermined volume of waste stream liquid into the reservoir through the at least one solids trap. The volume is suitably sufficient to fill the reservoir to operating volumes/liquid levels which are sufficient to contact the contaminant trap with the waste stream liquid, or to at least partially submerge the contaminant trap, and preferably, also the solids trap in the waste stream liquid.

Further suitably, the method further comprises outputting the decontaminated waste stream liquid from the reservoir to the main sewage system. Typically, output occurs after the solid particulate and one or more other pollutant levels have reached a desirable, predetermined level after treatment.

Thus, it will be understood that the invention provides a method of decontaminating a waste stream by removing or substantially removing therefrom solid particulate and one or more other pollutants in a convenient manner which firstly involves separating the solid particulate contaminant from contaminated waste stream liquid by passing the waste stream liquid into a reservoir for holding received waste stream liquid by flowing the waste stream liquid into the reservoir through a reservoir inlet which is in fluid communication with the source of the waste stream liquid and the reservoir. The method preferably includes positioning within the reservoir the at least one contaminant trap configured to sequester and removably accommodate the one or more other pollutants therein relative to at least one solids trap, such that removing the solids trap and/or the particulate material from the solids trap drains the waste stream liquid from the contaminant trap. Suitably, the at least one solids trap is positioned within the reservoir away from the reservoir floor, preferably at a level higher than the reservoir floor.

Suitably, the method further comprises allowing the predetermined volume of waste stream liquid to reside in the reservoir for a predetermined period of time. Thus, it will be appreciated that the waste stream liquid received into the reservoir is temporarily stored therein, typically for a predetermined duration of time that is sufficient for a predetermined amount of the one or more other pollutants present to be removed from the waste stream liquid though capture via the contaminant trap. For example, depending on the size and volume of the reservoir, and the volume of waste stream liquid entering the system as well as the size and activity of the traps, the waste stream liquid present may be held for as short a period as a few days to a number or weeks or indeed months, and more preferably days, depending on regulatory requirements. Thus, the contacting step of the above method occurs for a time period within this range that is sufficient to allow a desired level of pollutant removal to occur. It will be further understood that the step of separating the solid particulate material contaminant from the waste stream liquid is carried out by passing the waste stream liquid comprising the solid particulate material into a reservoir for holding received waste stream liquid to be decontaminated, whereby contaminated waste stream liquid is passed through a reservoir inlet which is in fluid communication with the at least one solids trap. It will be understood that the solid trap separates the particulate material contaminant from the waste stream liquid as the waste stream liquid flows through the solids trap from the inlet out of the solids trap into the reservoir. Thus, the waste stream liquid flowing out of the inlet, through the solids trap and into the reservoir is in substantially solid particulate free form. By 'substantially solid particulate free form', it is meant that a total dissolved solids level that comprises less particulate than what enters the solids trap, for example. Preferably, the total dissolved solids level is reduced down to <400 ppm, more preferably down <300 ppm, and most preferably <100 ppm, while >90%, and more preferably >95%, and most preferably >98% removal of all solid materials, can readily be achieved using the methods of the invention.

In one embodiment, the step of arranging the at least one solids trap and at least one contaminant trap in a relative configuration in the reservoir requires that the at least one contaminant trap be positioned within the reservoir relative to the at least one solids trap, such that during use wherein the waste stream liquid occupies the reservoir to a particular fluid level, both traps are at least partially submerged in the waste stream liquid and/or contact the waste stream liquid in the reservoir, whereby removing the solids trap and/or the solid particulate material from the solids trap reduces the fluid level in the reservoir to drain the waste stream liquid from the contaminant trap. This arrangement conveniently allows removal of the one or more pollutants from the contaminant trap in substantially waste stream liquid free and/or waste stream liquid drained form. In any case, the least one solids trap may be positioned within the reservoir away from and/or above the reservoir floor, preferably at a level higher than the reservoir floor.

Also described herein is a waste stream decontamination system for removing solid particulate and one or more pollutants from waste stream, the system comprising:

at least one reservoir for waste stream to be decontaminated, the reservoir having at least one inlet for receiving the waste stream into the reservoir and at least one outlet for removal of decontaminated waste stream from the reservoir;

at least one solids trap in direct fluid communication with the at least one inlet for separating solid particulate material from the received waste stream before the waste stream enters into the reservoir;

at least one contaminant trap for removing the one or more pollutants from the waste stream received into the reservoir, wherein the contaminant trap is configured to sequester one or more pollutants therein; and wherein the contaminant trap is arranged within the reservoir to drain waste stream therefrom to generate sequestered pollutants that are substantially waste stream free and/or drained of waste stream.

As explained above, in one embodiment, the at least one solids trap and the at least one contaminant trap are preferably arranged within the reservoir such that when the reservoir is filled with waste stream liquid, the at least one contaminant trap contacts the waste stream liquid and/or is at least partially submerged in the waste stream liquid. It will be understood that where the at least one contaminant trap is at least partially submerged in the waste stream liquid, the one or more other pollutants in the waste stream liquid can contact the contaminant trap. Preferably, the at least one solids trap and the at least one contaminant trap are positioned relative to each other within the reservoir, such that removal of the solids trap and/or particulate material from the solids trap allows drainage of the waste stream liquid from the contaminant trap to allow the pollutants to be removed from the contaminant trap in substantially waste stream liquid free and/or waste stream liquid drained form.

Alternatively, the contaminant trap can be drained of liquid by removing the trap from the reservoir to substantially drain liquid therefrom.

In a preferred embodiment, the waste stream decontamination system is a hydrocarbon trap or interceptor for minimising/controlling the amount of hydrocarbon based pollutants, for example, a grease trap/inceptor, for minimising/controlling fats, oil and grease, entering a sewage system.

Suitably, the contaminant trap is a hydrocarbon trap, configured to sequester one or more hydrocarbon based pollutants from the waste stream and preferably to removably accommodate the one or more hydrocarbon based pollutants therein. The contaminant trap preferably actively removes hydrocarbon based pollutant from waste stream in the vicinity of the trap. In this regard, preferably, the contaminant trap is configured to accommodate one or more sorbent materials for sorbing hydrocarbon based pollutants therein. In a preferred embodiment, the contaminant trap is adapted or configured to replaceably accommodate the sorbent materials therein. In another embodiment, the contaminant trap may be the sorbent material alone, which does not need to be provided in a container or a receptacle and can be simply provided on the surface of liquid in the reservoir.

In one embodiment, as explained above, the hydrocarbon based pollutant is preferentially sorbed by one or more suitable sorbent materials provided in the contaminant trap. It will be appreciated that a sorbent material is one which is capable of absorption and/or adsorption of a substance. Thus, in a preferred embodiment, the sorbent is one capable of removal of hydrocarbon based pollutants from the waste stream liquid into or onto the sorbent material. Thus a preferred sorbent material may capture the hydrocarbon based pollutants within the material, or may adsorb the hydrocarbon based pollutants onto the surface of the sorbent materials therein.

Most preferably, the sorbent materials capture and sequester the one or more pollutants in preference to any aqueous components present, typically water. Thus, in the case of hydrocarbon based pollutants, the one or more sorbent materials are for example, oleophilic materials that preferential sorb hydrocarbon based pollutants over water or other aqueous fluids. Most preferred sorbent materials of the invention are simultaneously oleophilic and hydrophobic sorbent materials. Thus, the preferred sorbent material of the invention is one that is capable of absorption and/or adsorption of pollutants in preference to waste stream or other aqueous fluids. Most preferably, the sorbent material is capable of sorbing liquid and/or solid and/or dissolved gas forms of the pollutant.

Depending on the nature of the sorbent material used, the sorbent material may be suitable for single use or multiple uses. Thus, in some embodiments, the sorbent material may be disposable after a single or limited number of uses, for example, from 2 to 5 uses, whereas in other embodiments, the material can be used for multiple decontamination cycles prior to disposal. Suitably, multiple decontamination cycles involve greater than 5 reuses, and/or rounds of sorbent material recycling.

It will be understood that depending on the nature of the sorbent material in question, sequestered pollutant recovery from the sorbent material is encompassed by the present invention. In particularly preferred embodiments, the sorbent material may be suitable for pollutant recovery from the sorbent material, for example, where the pollutants are recoverable by physically and/or chemically treating the sorbent material. For example, in the case of recyclable sorbent materials, squeezing and/or pressing the sorbent materials may be sufficient to remove/recover the associated pollutant from the sorbent material. If desired, the squeezing action may be carried out using centrifugation or the like. In other embodiments, a combination of squeezing, pressing and/or centrifugation may provide particularly good pollutant recoveries from the sorbent material. Suitably, if desired, the recycled or fresh sorbent or mixtures thereof, can be returned to the contaminant trap via blow-back methods or by use of slurry. Where the pollutant cannot be easily removed from the sorbent material through pressing or squeezing for example, it will be appreciated that the material may be best suited for single use and subsequent disposal after removal from the trap.

From the above, it will be understood that in one embodiment, during use, when waste stream liquid fills the reservoir to a particular level, for example, the normal operating level, which for example, may be determined by the position of the traps, the volume and dimensions of the reservoir, as well as the position of the one or more inlets and outlets which are in communication with the reservoir. The operational water level can be determined in light of the typical operating volumes and flows rates in and out of the system. It will be appreciated that when located correctly relative to one another, when a certain amount of particulate has been collected in the solids trap, the mass of the particulate contributes to the waste stream liquid level in the reservoir. Likewise, the amount of sorbent provided in the contaminant trap will also influence the liquid level in the reservoir. Thus, when the solids and contaminant trap are correctly positioned relative to each other in the reservoir, during normal use, the solids trap and the contaminant traps contact, and/or are at least partially submerged, under the waste stream liquid residing the reservoir. As explained above, the mass of particulate collected in the solids trap and contents of the contaminant trap in contributes to the level of the waste stream liquid in the reservoir. It follows that removal of the solids trap and/or the particulate from the solids trap will lower the liquid level of the waste stream residing in the reservoir by an amount that corresponds to the mass of the removed particulate, preferably via a downward displacement process. Thus, in an embodiment where the solids trap and the contaminant trap are positioned relative to each other within the reservoir in an arrangement wherein the solids trap and the contaminant trap and/or the sorbent material provided therein are at least partially submerged, removal of particulate and/or the trap and particulate will reduce the waste stream liquid level in the reservoir such that level of liquid surrounding the contaminant trap and/or the sorbent material provided therein drops or falls, preferably to a level below, or at least towards, the bottom of the contaminant trap.

Thus, the system and process of the invention advantageously provides a relatively simple system that allows for a solids, and one or more other pollutants cleanup efficiency that was not previously achievable using comparable clean up systems without use of expensive processing/further treatment. The effectiveness of the present system is such that solids, and one or more other pollutants in a waste stream can be reduced to nearly negligible levels (described elsewherein herein) when treated using the system and process of the invention.

The solid particulate material may be, for example, food scraps from cooking or dish washing and include solid particulates, such as rice, grains and seeds, burnt food scraps, which are prone to oxidation and putrefication under the conditions encountered in the reservoir, particularly where stored therein for extended periods of time. In some embodiments, the waste stream may also comprise mud, sand, gravel and other such particulates including silica based particulates.

Desirably, the waste stream is an aqueous based waste stream, for example, a water based waste stream, such as waste water from domestic or commercial sources. Preferably, the waste stream is contaminated water that comprises undesirable levels of fats, oils and/or grease. For example, such waste stream may arise from waste water or any other source of water based waste stream that would benefit from cleanup of fat, oil, grease and/or solids. For example, the waste stream may be contaminated water, waste water and/or run off from, for example, domestic, industrial and/or commercial sources, including restaurants, laboratories, residential estates, hospitals, and the like. Suitably, the contaminated water is waste stream from such sources that is usually routed to a waste water treatment plant, or more particularly, to a grease trap or interceptor for water cleanup, particularly, solids and/or fats, oils and grease removal or at least reduction in same. In a preferred embodiment, the waste stream decontamination system of the invention is a grease trap, used for example, to sequester fats, oil and grease from waste water from commercial entities such as restaurants, etc. The system of the invention provides an effective means for separate sequestration of solids and hydrocarbons, particularly, fats, oils and grease (FOG), from such waste water waste streams.

Most preferably, the solids and/or contaminant trap is adapted such that the trap itself, the solids collected therein and/or one or more hydrocarbon sorbent materials provided therein may be conveniently removed from the trap and/or reservoir when a predetermined amount of contaminant has been removed from the waste stream liquid. For example, when the solids and/or contaminant trap capacity is reached, one or more of the traps will be due for cleaning and/or sorbent material replacement. Preferably, the solids trap is adapted to facilitate ease of removal and return of the trap to the reservoir. However, in some embodiments the solids trap may be adapted to conveniently remove the particulate directly therefrom, that is without concurrent removal of the trap itself. More preferably still, the contaminant trap is further adapted such that the one or more sorbent materials can be easily returned to the trap, for example, in embodiments where the one or more hydrocarbon sorbent materials are recyclable or indeed where fresh sorbent material is required.

While the solids trap could be placed in the inlet to the reservoir, this manner of configuration is less desirable since it would limit the capacity of the solids traps unnecessarily and would potentially lead to blockages and/or shorter maintenance intervals. Therefore, it is preferable that the solids trap is a flow through solids trap in direct fluid communication with the at least one inlet such that waste stream liquid flowing through the inlet encounters the solids trap prior to discharge into the reservoir. Thus, preferably, the solids trap is provided within the reservoir. One useful location is at the exit of the inlet pipe into the reservoir or at the entrance to the reservoir. In a preferred embodiment, the position of the solids trap is provided within the reservoir but in the direct path of the waste stream as it enters the reservoir for holding, such that solids are removed from the waste stream liquid before the waste stream liquid provided to the reservoir. In this manner, the waste stream liquid residing in the reservoir is in substantially particulate free form. It will be understood that over time the solids accumulate in the solids trap such that periodic cleaning of the trap becomes necessary to ensure acceptable operation of the waste stream decontamination system.

In one embodiment the contaminant trap is provided in the form of a pollutant sorbent material, which may float on top of the liquid in the reservoir. In another embodiment, the trap is in the form of a container which may be provided with pollutant sorbent material. In this case, it will be understood that one or more of the solids trap and/or the contaminant trap are flow through traps, whereby liquid can flow both in and out of the trap. In other words, the traps are permeable to fluids/liquids, particularly, waste stream liquid, such that a substantial amount of waste stream contaminant present, that is, solids and/or one or more other pollutants as appropriate, may enter the respective traps. It will be further understood that, during normal use, where each respective trap has not reached maximum capacity, only waste stream liquid substantially free of solids and or other pollutants leaves the respective traps. In particular, the solids trap is adapted and/or positioned in the waste stream decontamination system such that waste stream liquid flows from the source through the inlet into the solids trap such that solids are separated from the waste stream liquid by collection in the trap, such that only substantially solids free waste stream liquid enters the reservoir for other pollutant treatment. This is in contrast to comparable prior art waste stream decontamination system in which solids containing waste stream liquid fills the reservoir for holding until solids and/or particulate materials sediment at the bottom of the reservoir under force of gravity.

In one embodiment, the contaminant trap and/or the one or more pollutant sorbent materials provided therein, are removable from the waste stream decontamination system for periodic cleaning of sequestered other pollutants therefrom. Preferably, the contaminant trap and/or one or more fresh or recycled pollutant sorbent materials may be easily returned and/or correctly repositioned within the reservoir for a subsequent round of treatment.

In certain embodiments, the contaminant trap itself is removably or immoveably fixed in position within the waste stream decontamination system, for example, through mounting or tethering means, whereby the trap is allowed a degree of movement within the reservoir which is restricted by a length of tethering means provided. Removably fixed, means the trap can be removed from the reservoir when desired. Thus, where the contaminant trap comprises sorbent material alone, it is fixed in position on top of fluid in the reservoir until it is removed from the reservoir. Preferably, the trap is adapted to enable convenient removal of the one or more pollutant sorbent materials provided therein when cleaning/maintenance is required. Likewise, the solids trap can be immoveably fixed but adapted for convenient removal of the collected solids.

The waste stream decontamination system of the invention can be custom built for any given required installation specification or can be retrofitted to a suitable existing system in accordance with the present invention.

Furthermore, in a preferred embodiment, the invention allows recycling and reuse of the sorbent material for example, an oleophilic/hydrophobic material, which can be conveniently used to sequester pollutants, for example, fats, oils and grease, while allowing periodic removal of same with minimal concurrent removal of waste stream liquid which adds significantly to prior art system maintenance costs as well as waste land fill costs.

Furthermore, the separated solids and pollutants recovered from the system are such that they can be suitably used in further applications, particularly in the case of hydrocarbon based pollutants such as fat, oil and/or grease. Thus, suitably, rather than being provided to landfill, preferably, the recovered solids and pollutants may find application as consumable products in industry or other applications. For example, the recovered solid materials from food based and/or cooking waste streams can potentially be used for agricultural applications and/or as a combustible solid fuel for power generation, for example, turbine based power generation. To date, recovered solids from prior art grease traps typically in the form of sediment at the bottom of the trap can be contaminated with heavy metals, and as a result, agricultural applications have not previously been possible/desirable using the by-products of conventional solids/hydrocarbon based pollutant removal from waste stream liquids. Thus, another aspect of the invention involves use of the solid particulate material recovered by the method of the invention in an agricultural application and/or as a combustible solid fuel for power generation.

Desirably, the recovered hydrocarbon based pollutants, particularly those high in animal fat, grease and oil, may be used in biodiesel applications, for example, as an oil feedstock for the production of biodiesel, for example, via catalytic transesterification processes whereby the oil, grease and fat is reacted with an alcohol to form biodiesel. Thus, a further still aspect of the invention involves use of the hydrocarbon based material recovered by the method of the invention as a fuel or in a fuel application for example, biodiesel, or as a feedstock for the production of biodiesel.

In a particularly preferred embodiment, the solid traps and/or the contaminant trap may be adapted to impede waste stream liquid ingress into the trap while the solids/sorbent are being removed. Such an arrangement is desirable since this assists in removal of the solids/sorbent in substantially waste stream liquid free form. In other words, minimal waste stream liquid is simultaneously removed with the solids/sorbent. Suitable adaptations include one way valves built into the trap that allow fluid drainage but prevent fluid ingress from the trap when, for example, a vacuum is applied. Suitable one-way valves may be fabricated from flexible membrane materials, such as rubber membranes or the like. It will be understood that during use, for example, where removal of the contents of the trap is accomplished by suction, vacuum action on the one way valves draws the flexible membrane materials against the body of the trap thereby closing the valves. It will be evident that, when present, the valves are provided in one or more walls of the trap.

In a preferred embodiment, the waste stream decontamination system may be provided below ground level. In such a case, the system is a subterranean system. However, the waste stream decontamination system is not restricted to underground use, on-ground or off-ground analogues may be used. One or more optional pumps from assisting in waste stream flow in, around and out of the system can be included if required.

While it will be appreciated that the waste stream decontamination system of the invention may have a single solids and a single contaminant trap arrangement, the waste stream decontamination system is not restricted to such an arrangement. Indeed, suitably, the waste stream decontamination system may comprise a plurality of any of the above described features, for example, the waste stream decontamination system may comprise a plurality of inlets, outlets, solids and/or contaminant traps for example, as needed.

In one embodiment, a single waste stream decontamination system of the invention can be used alone in decontamination applications. In another embodiment, a plurality of waste stream decontamination system of the invention, for example, arranged in an array or linear configuration. For example, two or more systems may be arranged linearly, in parallel or in an array. In the case of an array system, the array may be in but not limited to, for example, an array having a 2×2, 3×3, 2×6, 3×4, 4×5, etc. configuration.

In one embodiment, the solids and/or contaminant traps are preferably adapted for use with a mechanically operated separator which assists in the selective removal of solids and/or sequestered other pollutants from the respective traps with minimal concurrent recovery of waste stream liquid. However, in another embodiment, the solids and/or sequestered other pollutants can be removed manually from traps which are adapted for manual removal (by a hand operated device/system that results in lifting). In a particularly preferred embodiment, the waste stream decontamination system of the invention comprises solids and/or contaminant traps that are most preferably adapted for respective solids and/or other pollutant removal from the respective traps by both mechanical means and manual means. For example, the removal by mechanical means may be accomplished by use of a mechanically operated separator such as a vacuum system capable of removal of the respective solids and/or sequestered pollutants in substantially drained form, meaning the solids and/or hydrocarbons are drained of waste stream liquid, whereas manual removal may simply involve removal using known hand held implements or tools. As explained above, vacuum separation is preferred in the case where one way valves are fitted on a trap for the reasons described herein. Thus, suitably, in the above methods, one or more of the removing steps is carried out mechanically or manually, for example, by applying a vacuum to the one or more traps.

Suitably, the waste stream decontamination system of the invention, and more preferably, one or more of the components of the waste stream decontamination system may be adapted with one or more protective materials and/or substances that impart further advantages to the system. In a preferred embodiment, at least the solids and/or contaminant trap comprise or are treated with such protective materials and/or substances. The various components may be formed from, coated, lined and/or impregnated with one or more of such protective materials and/or substances which preferably include nano materials, including nano, particularly, carbon nano materials, corrosion resistant materials, including stainless or galvanised steel, or durable plastics such as polyethylene, polypropylene, PTFE, PVC, nylon and/or materials permeable to water, but impermeable to the solids or other pollutants/sorbent materials. Advantageously, use of such materials and/or substances prolongs the lifetime of the waste stream decontamination system components and assists in prevention of breakdown through corrosion or otherwise.

Preferably, the reservoir may be fabricated from a suitable fluid/liquid impermeable material, such as concrete, fibreglass, stainless steel, galvanized steel, durable engineering plastics such as polypropylene, or other corrosion resistive materials, or indeed combinations of two or more of such materials.

Furthermore, the one or more components of the system, for example, the reservoir, solids trap, contaminant trap, inlets and/or outlets can be fabricated from 'smart' materials, or 'smart' materials can be incorporated into the waste stream decontamination system of the invention, for example, antimicrobial materials and/or antifouling materials that prevent undesirable microbial buildup, reduce biological or chemical oxygen demand, or other substances that improve the flow dynamics through the reservoir or traps and/or reduce odours, etc.

The reservoir may be any desired shape, such as round, spherical, cylindrical, square or rectangular shaped, for example. Likewise, the solids trap and/or the contaminant trap may be any convenient shape and size, depending on the size, dimension and/or shape of the reservoir. In one embodiment, the contaminant trap may be provided in the form of one or more pollutant sorbent material which may be directed provided to the liquid in the reservoir. However, in a preferred embodiment, one or more of the solids trap and/or the contaminant trap may be in the form of container, for example, a basket formed from a porous yet stiff or rigid material fabricated from, for example, a mesh, web or net configuration. In another embodiment, the trap may be in the form of a sock, such as a flexible sock arrangement. It will be understood that such a configuration provides a screen, barrier and/or filter fabricated from connected and/or interwoven, knitted and/or welded strands of metal, fibre and/or other flexible materials. It will be understood that such configuration provides the solids trap and/or the contaminant trap structure with a plurality of orifices that allow waste stream liquid and other fluids to pass through. Suitably, the mesh size is sufficiently small to prevent a predetermined amount of particulate material passing through such that particulate material is caught by the trap thereby ensuring the waste stream outflowing from the trap comprises less solid particulate material than the waste stream entering the trap. Typical opening sizes of from about 150 to about 500 microns, more preferably from about 300 to 400 microns are preferred.

It will be evident that the solids trap includes an opening on the inlet side dimensioned to allow waste stream and solids/particulate material to enter the trap.

In the case of the contaminant trap, the design of the contaminant trap is selected to ensure that the trap can accommodate the one or more sorbent materials mentioned above, while allowing sorption of waste stream liquid in the vicinity of the trap to flow into the trap for capture by the sorbent material and out from after pollutant is sequestered. It will be appreciated that design will be sufficient to prevent substantial amounts of the sorbent material from falling out of the trap.

In either case of the solid and/or contaminant trap, if necessary the trap, when provided in container form, may be provided with a lining or a sock of further liquid-, but not solid-, permeable material. It will be further understood, that the reservoir itself may be provided with a lining material that can be periodically removed to clean the reservoir and/or remove any sediment and/or build up in the reservoir.

In a further embodiment, the waste stream decontamination system of the invention may be provided with one or more sensors to determine when one or more of the traps need to be cleaned out, or when the contaminants in the reservoir are at a particular level, thereby signalling a reservoir pump out for example.

The convenience of the waste stream decontamination system of the invention and methods of using same will result in increased/improved compliance with regulatory waste stream cleanup requirements, particularly, grease trap/interceptor cleaning and maintenance scheduling. To this effect, it will be understood that a reduced biochemical oxygen demand (BOD) requirement within the waste stream decontamination system is achievable due to reduced bacterial break down of solids waste. Less bacterial activity will result in reduced accumulation of noxious bacterial metabolites and/or gases, particularly, hydrogen sulfide. This effect has obvious benefits to maintenance operator safety, as well as to the environment.

In a further aspect, there is provided a kit for retrofitting a waste stream decontamination system, the kit comprising:
at least one solids trap in accordance with the invention, and
at least one contaminant trap in accordance with the invention, and optionally instructions for retrofitting an existing system.

In another aspect, the invention provides for a use of one or more traps to remove solids and/or other pollutants in a method of decontaminating a waste stream of solid particulate and one or more other pollutants from waste stream liquid. Preferably, the solids and one or more other pollutants and corresponding traps are as described herein. Preferably, the contaminant traps comprises one or more materials for sorbing the one or more pollutants, particularly hydrocarbon based pollutants as described herein, from waste stream liquid. Most suitably, the material is an oleofilic/hydrophobic material, preferably a recyclable material that can be used in the methods more than once.

In another aspect, the invention provides for the use of one or more contaminant traps, optionally comprising one or more sorbent materials in a waste stream decontamination system and/or method in accordance with the invention. Preferably, such use involves a disposable or a recyclable oleophilic/hydrophobic sorbent material. As described elsewhere herein, suitably the materials are recyclable and/or reusable in the methods/system of the invention.

In another aspect still, the invention provides for the use of the waste stream decontamination system of the invention in a method of removing solids and/or one or more other pollutants, particularly hydrocarbon based pollutants from waste stream liquid in accordance with the method of the invention.

In another aspect, the invention provides for the use of the waste stream decontamination system of the invention as grease trap/interceptor, particularly, an industrial and/or domestic grease trap.

In one preferred embodiment, a single solids trap is used in conjunction with two or more contaminant traps, which can be positioned throughout the reservoir as required.

In yet a further aspect, the invention provides for the use of the waste stream decontamination system of the invention above and/or below ground in the implementation of one or more of the methods of the invention.

In yet a further aspect, the invention provides for the use of recyclable sorbent material in the waste stream decontamination system and/or in the process of the invention as described herein to actively sequester one or more pollutants, for example, hydrocarbon based pollutants, from waste stream liquid. Preferably the sorbent material is an oleophilic/hydrophobic material that is capable of adsorbing and/or absorbing hydrocarbon based pollutants, particularly in preference to aqueous waste stream liquid.

As explained above preferred sorbent material suitable for selective sequestration of pollutants, especially hydrocarbon based pollutants, from waste stream liquid are particularly preferred. Preferably, the sorbent material is a recyclable sorbent material from which sequestered pollutant can be recovered, thereby allowing reuse of the sorbent material in the method/system of the invention. Suitably, the preferred sorbent material has oleophilic properties and preferably simultaneously hydrophobic properties such that the material actively removes hydrocarbon based pollutants from waste stream liquid in preference to water for example.

Preferably, such materials consist of or comprise natural materials such as cellulose materials. Regenerated celluloses comprising mixtures of various pulps and rayon; fibres comprising a synthetic polymer such as polypropylene, polystyrene, polyurethane, etc.; or sponges are mainly used and as adsorbents for fine oil droplets dispersed in water, synthetic fibres comprising a hydrocarbon polymer such as polypropylene, etc., may also used. It will be understood that oleophilic/hydrophobic sorbent materials are particularly preferred. The sorbent material is typically a highly porous material, such as those described in U.S. Pat. No. 3,862,963, the contents of which are hereby incorporated by reference. Crude lints or lintels from seeds, for example, cotton seeds have very good oil absorbency capability and desirable levels of water repellancy. Most preferably materials are oil adsorbents which have a high oil adsorption, have a high solvent resistance, are low cost, and are non-polluting. Further exemplary sorbent materials are described in U.S. Pat. Publication No. 4,102,783, the entire contents of which are hereby incorporated by reference. An adsorbent for oily materials comprising a combination or a mixture of crude lints or crude linters as the main component and filter papers or synthetic, semi-synthetic, or natural fibres as an additional component is also suitable for use herein. In this invention, the crude lints or crude linters may be used as they are as the oil adsorbent or they may be used as a mixture thereof with about 5 to about 50% by weight refined natural fibres, thermoplastic synthetic fibres, and/or semi-synthetic fibres (hereinafter, simply "fibres"). These materials are mainly formed into a mat, a strand, etc., of the fibrous mixture, and are used for removing by adsorption oily materials floating on the surface of the water. When the crude lints or crude linters or a mixture of the crude lints or crude linters and the above-described fibres is used for separating by adsorption oily materials present in water in an emulsified state or dispersed state, the oil adsorbent can be used in the form of a fixed bed or a fluidized state. Other exemplary sorbent materials, include the foam based materials which are described in U.S. Pat. Publication No. 3,862,963, the entire contents of which are hereby incorporated by reference. Typical adsorbent materials described therein are made of a foam substance consisting of 5-90 percent by weight of a synthetic resin insoluble in water as well as oils and 10-95 percent by weight of an inorganic filler and having a bulk density of less than 1. The foam substance is used in the form of sheets or particles.

Definitions

By 'waste stream liquid', it is meant that a fluid, particularly, a liquid that is released as waste, for example, from a domestic, commercial and/or industrial source. In particular, the waste stream is a liquid, typically an aqueous liquid, that comprises for example solid particulate matter and/or one or more other pollutants, for example, hydrocarbon based and other pollutants, as defined herein. Most particularly, the waste stream is one from food or cooking related activities, and for example, is released from commercial kitchens and the like. It will be understood that a 'contaminated waste stream' is a liquid that comprises one or more wastes including at least solids particulate and/or one or more other pollutants, especially hydrocarbon based pollutants, as defined herein. When treated by the methods/systems of the present invention the waste stream liquid is treated and a decontaminated waste stream liquid is produced.

By 'decontaminated waste stream' or 'decontaminating the waste stream', it is meant that waste stream liquid comprising at least solids particulate and/or one or more other pollutants, particularly hydrocarbon or hydrocarbon based pollutants, as defined herein is treated to remove at least a portion of at least solids particulate and/or the other pollutants from the waste stream liquid to result in a treated or decontaminated waste stream liquid that comprising reduced amounts of these contaminants compared to waste stream liquid entering the system before treatment.

By 'sequesters', it is meant that contaminant in the waste stream liquid is removed away from, held away from, or isolated away from waste stream liquid.

By 'solid particulate', it is meant a material in the form of separate/individual particles, for example, sand, silica or mud grains or particles, as well as food particulate including food scraps from cooking or dish washing and include solid particulates, such as rice, grains and seeds, burnt food scraps, which are prone to oxidation and putrefication under the conditions encountered in the reservoir, particularly where stored therein for extended periods of time.

By 'solids trap', it is meant a device for retaining and/or preventing passage of solid particulate while allowing fluid to pass, for example, a filter or a fluid permeable container comprising sorbent.

By 'pollutant', it is meant to include inorganic based pollutants, organic based pollutants, microbial pollutants, and combinations thereof. It will be appreciated that inorganic based pollutants include heavy metals, such as cadmium, mercury, lead, and arsenic; inorganic sulfides, such as hydrogen sulfide; inorganic acids such as sulphuric acid, silicon based pollutants, etc. It will be further appreciated that organic pollutants include organic compounds including organic acids, ethers, esters, ketones, organic salts, etc., hydrocarbon based pollutants including fats, oils, greases, petroleum compounds including volatile organic compounds such as benzene, xylene, toluene, etc., pesticides; herbicides; drug actives and/or metabolites, dissolved gases such a methane. Preferably, the hydrocarbon based pollutants include includes fat, oil, and grease from food preparation or cooking sources.

By 'waste water stream', it is meant a waste stream liquid is, for example, a waste water run off, for example, from an industrial plant, such as a chemical manufacturing, processing or treatment plant including plastics plant, a pharmaceutical, pesticide or herbicide plant, domestic, industrial, commercial facilities, including restaurants, food preparation and/or businesses, agriculture, sewers and stormwater.

By 'contaminant trap', it is meant a device for sequestering and/or preventing passage of pollutants, especially hydrocarbon based pollutants, while allowing fluid/liquid to pass through the trap. For example, the contaminant trap can be a container with sorbent, whereby the container can be a flexible sock, a rigid container such as a basket, or it can be one or more sorbent materials alone.

By 'waste stream liquid drained', it is meant that liquid has been removed from a material by the liquid flowing away from or out of the material. A material is drained where it comprises any amount of less liquid than present prior to draining.

By 'substantially pollutant-free waste stream liquid', it is meant a liquid that has been treated by the methods/system of the invention which after treatment comprises any amount of less pollutant than present prior to treatment.

By 'substantially solid particulate-free waste stream liquid', it is meant a liquid that has been treated by the methods/system of the invention which after treatment comprises any amount of less solid particulate than present prior to treatment.

By 'sequestered pollutants that are substantially waste stream liquid free', it is meant pollutants that have been isolated from and drained of waste stream liquid as defined herein.

By 'substantially drained form' in relation to a material, for example, solids and/or sequestered pollutants, means that the solids and/or sequestered pollutants have been drained of waste stream liquid as defined herein. It will be understood that a drained form of material may still comprise at least some quantity of the liquid, however, when drained, the amount of solid material will be greater than the amount of liquid present. Whereas in undrained form, it will be understood that the amount of liquid present will be equal to or greater than the amount of solid material present.

By 'sorbent materials', it is meant that the one or more materials that are capable of selectively removing pollutants from a contacted waste stream liquid through a process of adsorption and/or absorption of pollutants onto and/or within the sorbent material.

By 'recyclable sorbent material', it is meant that a sorbent material that can be treated to remove sequestered pollutants and reused to sequester further pollutants.

By 'oleofilic', it is meant that a material that has an affinity for hydrocarbon based components and not aqueous materials.

By 'hydrophobic', it is meant that a material that has a little or no affinity for aqueous materials, particularly water.

By 'immoveably fixed', it is meant that that a component is incapable of being moved and/or is fixed in a stationary position.

By 'removable fixed', it is meant that that a component is capable of being moved around and/or from a reservoir, via a temporary fixing means, for example, tethering means.

By 'container', it is meant a receptacle, such as a basket, having one or more porous walls having pores and/or a plurality of orifices defined therein. For example, the container may comprise one or more walls in the form of a screen, barrier and/or filter fabricated from connected and/or interwoven, knitted and/or welded strands of metal, fibre and/or other flexible materials.

BRIEF DESCRIPTION OF THE DRAWINGS

The invention will be more clearly understood from the following description of an embodiment thereof, given by way of example only, with reference to the accompanying drawings, in which:

FIG. 1 illustrates an isometric view of a 3D representation of one example of the waste stream decontamination system of the invention, being in particular in this example, a grease trap; and FIG. 2 illustrates a section view of the waste stream decontamination system of FIG. 1.

DETAILED DESCRIPTION OF A PREFERRED EMBODIMENT

Referring now to the drawings and specifically FIGS. 1 and 2 inclusive and initially FIG. 1, which shows a front top right isometric view of a 3D representation of an assembled waste stream decontamination system of the invention, being in particular a grease trap, illustrated generally by reference number 1. The assembled grease trap 10 shown is generally rectangular in shape is comprises of four side walls A-D, consisting of front wall A, rear wall B and two side walls C and D respectively, bounded by bottom wall E and defining a grease trap reservoir for holding waste stream liquid of a predetermined volume. The bottom wall E of the grease trap 10 shown has a downward slope aware from the inlet side of the reservoir. This means that during use over time any non collected solid particulate flows towards the rear end of the reservoir assisting in a full clean out if needed. In use, a top wall or cover F is positioned on top of the four side walls A-D, effectively closing off the grease trap when in use. The top wall or cover F or at least one or more portions of same are suitably adapted to be conveniently removed and/or accessed manually and/or automatically by appropriate mechanical means to assist in maintenance and periodic cleaning. For example, access portions positioned in the cover F over the solids trap 23 and contaminant trap 30 may be provided in cover F.

Front wall A comprises an inlet pipe 20, which in this example, deviates or partitions into two sub-inlets, one being an upper sub-inlet 21 and the other being a lower sub-inlet 22. It will be understood that such a dual sub-inlet arrangement is useful in the instances of a blockage occurring in one of the sub-inlet lines. The upper sub-inlet 21 and the other being a lower sub-inlet 22 feed directly into solids trap 23 which in this example is mounted within the reservoir volume of the grease trap proximate to the front wall A and positions so as to reside in use in a substantially submerged position within waste stream liquid in the reservoir as shown in FIG. 2. The solids trap 23 is fabricated from a mesh type material of small enough mesh size to allow waste stream liquid to flow from the solids trap 23 but to capture solid particulate in the trap. It will be understood that small enough particulate may escape the trap, so if desired, the solid trap 23 may be provided with a liner (not shown) of smaller still mesh size that can be used to reduce sedimentation and/or to give finer control to the collection of particulate if desired. It will be also appreciated that use of a disposable liner may allow for particularly convenient solids trap 23 cleaning.

Referring now to FIG. 2 which illustrates a section view of the waste stream decontamination system of FIG. 1, the grease trap 10 also comprises a waste stream outlet 25 located in this example on rear wall B and continues on to outlet pipe 25 which runs to a sewage system (not shown), for example. The waste stream outlet 25 is located a lower portion of rear wall B to minimise risk of untrapped floating hydrocarbons being run off to the sewage system.

The grease trap 10 also comprises contaminant trap 30 which is mounted within the reservoir volume at a location away from the solids trap and in a position so as to reside in use in a substantially submerged position within waste stream in the reservoir as shown in FIG. 2. In this example, the contaminant trap comprises a rectangular shaped basket or box which is fabricated from a meshed material of suitable mesh size to allow waste stream and hydrocarbon based pollutant to enter the contaminant trap 30, and treated waste stream to flow out of the contaminant trap 30, yet is fine enough to retain the sorbent material 31 before and after it has sorbed hydrocarbon from waste stream in the material's 31 proximity. The sorbent material 31 can be directly filled into the contaminant trap 30 or may further provided within a liner (not shown) provided in the contaminant trap 30 whereby such liner is may of a material for example nylon that will retain sorbent but is permeable to waste stream. It will be appreciated that a removal/replaceable liner can be convenient used to shorten cleaning time. The contaminant trap 30 can also comprise a one way direction waste stream valve (not shown) that prevents ingress of waste stream, when for example, a vacuum is applied to the trap to remove the contents thereof via vacuum means 35.

In the grease trap 10 of FIG. 1, the solids trap 23 and the contaminant trap 30 may comprise a lid 32, 34, which closes off the top of trap. Although not essential where the waterline 40 does not extend over the top of the traps, a lid is a useful safety feature in the event the grease trap 10 floods or the water level 40 rises above the topmost portion of the traps. It will be understood that where a lid is provided, it is suitably adapted to be conveniently removed and/or accessed manually and/or automatically to assist in maintenance and periodic cleaning.

The contaminant trap 30 is provided with one or more hydrocarbon sorbent materials 31 which are suitable for selectively removal of hydrocarbon based pollutants from the waste stream. Material 31 captures the hydrocarbons within or onto the surface of the one or more hydrocarbon sorbent materials therein in preference to aqueous components present.

In this example, the contaminant trap 30 may be lifted from the reservoir to provide hydrocarbon sorbent materials 31 in substantially drained from by application of a vacuum via vacuum means 35. Alternatively, the precise positioning of solids trap 23 and contaminant trap 30 within the reservoir with respect to the normal, in use, water line 40, is such that removal of collected particulate from a substantially full solids trap 23 has the effect of causing a drop in the level of waste stream in the reservoir such that a substantial amount of waste stream drains away from the contaminant trap 30. In other words, in use, on emptying the solids trap 23, the water level 40 surrounding the submerged contaminant trap 30 is reduced such that the contaminant trap 30 may be emptied conveniently without simultaneous removal of significant amounts of waste stream with the collected hydrocarbon.

Use of the System of the Invention

In use, waste stream liquid comprising hydrocarbons, such as fats, oils and grease from a commercial restaurant for example, flowing into the grease trap 10 reservoir through inlet 20 whereby the waste stream flow partitions and first enters the solids trap 23 via sub-inlets 21 and 22. Typically, the waste stream entering the grease trap 10 will be warm enough such that a substantial amount of the hydrocarbon based pollutant, particularly, fats, oil and grease (not shown) is in a liquid state, for example, dispersed within the waste stream. Therefore, the solid particulate as well as liquid fats, oil and grease contaminants enter the reservoir through flow through solids trap 23 whereby suitably sized solid particulate is retained in the trap and waste stream liquid and the fats, oil and grease contaminants flows through the mesh material of the trap into the reservoir.

The waste stream liquid level in the reservoir reaches water level 40 and remains substantially constant at this level which may be determined at least the volume of the grease trap 10 reservoir and the volumes of waste stream liquid entering and exiting the grease trap during use. Level monitoring and pump means (not shown) can be included to provide control if desired. After a time, as the waste stream liquid in the reservoir experiences reduce flow and/or turbulence, the fats, oil and grease contaminant tends to float upwardly towards the water level 40. Such fats, oil and grease contaminant in the vicinity of the contaminant trap flows into and/or is drawn into the contaminant trap, for example, through sorbent action of the sorbent material 31 provided therein. It will be understood that as the waste stream liquid cools, at least some of the fats, oil and grease contaminant may solidify or partially into small droplets or coagulant. In this case, it will be useful to select a contaminant trap mesh size that will allow ingress of such droplets or coagulant but avoids loss of sorbent material 31 from the contaminant trap. As explained above, a trap liner (not shown) may be useful in this case.

Decontaminated waste stream liquid, which has been treated by the method/system of the invention can then leave solids and/or contaminant trap and returns to the reservoir. As fresh waste stream liquid enters the trap, the downward slope of bottom wall E, assists in promoting the outward flow of decontaminated waste stream liquid from the grease trap 10 through outlet 25. Pumps (not shown) can be included to assist in this process, if desired. Likewise, waste stream liquid heating means can be included should solidified or partially solidified fats, oil and grease interfere with the proper functioning of the contaminant trap 30.

As need requires, typically when the solids trap 23 is substantially full, the grease trap 10 will require clean up and/or maintenance. In such case, the cover F is removed from the grease trap 10, or access ports the cover F therein are opened to allow operator or mechanical access to the traps. Particulate captured in the solids trap 23 is removed first and in preference to the contaminant trap 30 for the beneficial reasons described above with respect to reduction in water level 40 which allows a substantial amount of waste stream liquid to drain from the contaminant trap 30.

The solid particulate can be removed from the solids trap 23 and conveniently returned by scooping, vacuuming, or if the trap is lined, the lining containing the solids may be removed from the solids trap 23. When the water level 40 drop is complete, the level of waste stream liquid surrounding the contaminant trap should be reduced to below or nearly below the lower level of the contaminant trap such that substantially all of the waste stream liquid can drain from the contaminant trap 20. This means that the hydrocarbon based pollutant can be removed easily from the trap and without simultaneous removal of significant amounts of decontaminated waste stream liquid at the same time. This has obvious benefits from the perspective of minimising clean up, transport, storage and disposal of waste products from the grease trap 10. Where sorbent material comprising the sorbed fats, oil and grease component is hydrophilic is removed in this manner, it is substantially free of water or other aqueous contaminants. The sorbent material and sorbed hydrocarbon can then be disposed of, or if suitable, can be treated to remove and recover the hydrocarbon component prior to disposal. Depending on the nature of the sorbent material used, after hydrocarbon recovered, the recycled sorbent material can be returned to the contaminant trap for further use in the process of the invention.

Installation/Retrofit of the System of the Invention

During installation, the grease trap 10 in this example may be installed in a position as part of a new installation, or may be retrofit to a suitable existing grease trap system. As described elsewherein, the system can be installed underground, or in a fixed above ground or indeed mobile position.

In the case of retrofitting, it will be appreciated that after suitable clean up of the original system, the relatively positioning of the solids trap 32 and the contaminant trap 30 will be key to convenient use of the process of the invention, particularly the advantages with respect to reduce waste stream liquid collection and disposal which is a significant problem associated with existing grease trap maintenance/servicing.

CLAUSES REPRESENTING PREFERRED EMBODIMENTS OF THE INVENTION

1. A method of decontaminating a waste stream liquid of solid particulate and one or more other pollutants, the method comprising the steps of:
   (i) removing solid particulate contaminant from the waste stream liquid by passing the waste stream liquid through at least one solids trap into a waste stream liquid holding reservoir whereby solid particulate is retained in the at least one solids trap; and
   (ii) removing one or more other pollutants from the waste stream liquid in the reservoir by contacting the waste stream liquid with at least one contaminant trap whereby the contaminant trap sequesters the one or more other pollutants within the contaminant trap.
2. The method according to clause 1 further comprising the step of allowing decontaminated waste stream liquid to leave the reservoir to pass, for example, to a sewer or water network.
3. The method according to clause 1 or clause 2 wherein waste stream liquid entering the reservoir from the one or more solids trap comprises a reduced amount of solid particulate compared to waste stream liquid entering the at least one solids trap.
4. The method according to any one of clauses 1 to 3 wherein the at least one contaminant trap comprises one or more sorbent materials capable of sequestering, for example, by adsorption and/or absorption or other association, one or more of the pollutants from the waste stream liquid.
5. A method according to any one of the preceding clauses, wherein after contacting with the contaminant trap, the treated waste stream liquid comprises a reduced amount of pollutants compared to waste stream entering the reservoir from the one or more solids traps.
6. A method according to any one of the preceding clauses, further comprising the step of removing the solids trap and/or the solid particulate contaminant in the solids trap.
7. A method according to any one of the preceding clauses wherein the removing step (i) involves draining waste stream liquid from the solids trap thereby allowing solid particulate retained in the solids trap to be removed from the solids trap in a waste stream liquid drained form.
8. A method according to any one of the preceding clauses wherein the removing step (ii) involves draining waste stream liquid from the contaminant trap thereby allowing the sequestered other pollutants to be removed from the trap in a waste stream liquid drained form.
9. The method according to any one of clauses 7 or 8, wherein after removal of the solids and/or sequestered pollutants, the method involves returning the one or more solids and/or contaminant trap to the reservoir.
10. The method according to any one of clauses 7 to 9 wherein the step of draining waste stream liquid from the solids and/or contaminant trap involves raising the solids and/or contaminant trap out of the reservoir, and/or involves lowering a liquid level of waste stream liquid in the reservoir to below the level of the one or more solids and/or contaminant trap.
11. The method according to clause 10 wherein the steps of raising the solids and/or contaminant trap out of the reservoir and/or lowering a level of waste stream liquid in the reservoir is carried out using manual and/or mechanical means.
12. The method according to any one of clauses 1 to 9 wherein the method comprises leaving the solids trap and/or the contaminant trap in position within the reservoir and removal of the solid particulate contaminant and/or the other pollutants by manual, for example, by hand, and/or mechanical means, for example, by a vacuum or suction device.
13. A method according to any one of the preceding clauses further comprising the step of inputting a predetermined volume of waste stream liquid into the reservoir through the at least one solids trap, wherein preferably, the volume is suitably sufficient to fill the reservoir to operating volumes/liquid levels which are sufficient to allow the contaminant to contact the one or more pollutants.
14. A method according to any one of the preceding clauses wherein the at least one contaminant trap actively removes the one or more pollutants from the waste stream liquid in the vicinity of the trap.
15. A method according to any one of the preceding clauses wherein the at least one contaminant trap comprises one or more pollutant sorbent materials for sequestering the pollutant from the waste stream liquid, wherein the pollutant sorbent materials are preferably, oleophilic and more preferably oleophilic and hydrophobic sorbent materials.
16. A method according to any one of the preceding wherein the one or more solids trap and/or the one or more contaminant trap are in the form of a container or receptacle adapted to impede waste stream ingress into the trap while the solids/pollutants are being removed.
17. The method according to clause 16 wherein the one or more solids trap and/or the one or more contaminant trap comprise at least one-way valves preferably fabricated from a flexible membrane materials that prevents waste stream ingress into the trap on application of a vacuum.
18. A method of any one of the preceding clauses wherein the one or more solids trap and/or the one or more contaminant trap are provided with a liner into which solid particulate/sorbent material is provided.
19. A method according to any one of clauses 15 to 18 further comprising the step of recycling the one or more pollutant sorbent materials by recovering sequestered pollutants from pollutant sorbent materials.
20. The method according to clause 19 wherein the contaminant trap is or comprises one or more pollutant sorbent materials and the sequestered pollutants are recovered from the one or more sorbent materials by process involving squeezing and/or pressing the one or more sorbent materials to remove sorbed pollutants.
21. The method according to clause 19 or clause 20 wherein the recovering step is carried out mechanically or manually, preferably where the mechanical recovering step involves centrifugation.
22. A method according to any one of clauses 16 to 23 further comprising the step of returning new or recycled one or more pollutant sorbent materials to the reservoir and/or the at least one contaminant trap.
23. A method according to any one of the preceding clauses wherein the one or more other pollutants are hydrocarbon based pollutants.
24. A method according to any one of the preceding clauses wherein the waste stream is waste water from a domestic, industrial and/or commercial sources, preferably restaurants, laboratories, residential estates, and/or hospitals, car washes and/or oily water separators.
25. A method of decontaminating waste stream liquid of solid particulate and one or more hydrocarbon based pollutants, the method comprising the steps of:

(i) arranging at least one solids trap and at least one contaminant trap in a waste stream liquid holding reservoir in a configuration within the reservoir such that when the reservoir is filled to an operating level with waste stream liquid, the at least one contaminant trap is in contact with the waste stream liquid;

(ii) generating a substantially solid particulate-free waste stream liquid by passing the waste stream liquid through the solids trap into a waste stream liquid reservoir;

(iii) generating a substantially hydrocarbon based pollutant-free waste stream liquid in the reservoir by contacting the substantially solid particulate-free waste stream liquid with the at least one contaminant trap to sequester the one or more hydrocarbon based pollutants within the contaminant trap;

(iv) draining waste stream liquid from the contaminant trap to generate sequestered hydrocarbon based pollutants that are drained of waste stream liquid.

26. The method according to clause 25 wherein the step of draining waste stream liquid from the contaminant trap to generate sequestered hydrocarbon based pollutants that are drained of waste stream liquid involves removing the at least one solids trap and/or the particulate material from the at least one solids trap 27. The method according to clause 25 or clause 26 further comprising the step of removing the waste stream liquid drained sequestered hydrocarbon based pollutants from the contaminant trap and the reservoir.

28. A method according to any one of clauses 25 to 27 wherein the arranging step involves positioning within the reservoir the at least one contaminant trap configured to sequester and removably accommodate the hydrocarbon based pollutant therein relative to the at least one solids trap, such that removing the solids trap and/or the particulate material from the solids trap drains waste stream liquid from the contaminant trap.

29. A method according to any one of clauses 25 to 28 wherein the step of removing the substantially waste stream liquid free sequestered hydrocarbon based pollutant from the contaminant trap involves removing the hydrocarbon trap from the reservoir.

30. The method according to any one of the preceding clauses wherein the reservoir is a reservoir of a hydrocarbon trap/interceptor, for example, a grease trap/interceptor.

31. A method according to any one of the preceding clauses wherein the waste stream is water and the solid particulate comprises food and/or cooking originating solid particulate and/or the one or more pollutants are hydrocarbon based pollutants, particularly, one or more of food preparation, cooking and/or clean up originating fat, oil and/or grease pollutants.

32. Solid particulate material and/or pollutant material obtained by a method according to any one of clauses 1 to 31.

33. Use of the solid particular material of clause 32 in an agricultural application and/or as a combustible solid fuel for power generation.

34. Use of the hydrocarbon material of clause 32 in a biodiesel application or as fuel or a feedstock for the production fuel such as biodiesel.

35. A waste stream decontamination system for removing solid particulate and one or more pollutants from waste stream, the system comprising:

at least one reservoir for waste stream to be decontaminated, the reservoir having at least one inlet for receiving the waste stream into the reservoir and at least one outlet for removal of decontaminated waste stream from the reservoir;

at least one solids trap in direct fluid communication with the at least one inlet for separating solid particulate material from the received waste stream before the waste stream enters into the reservoir;

at least one contaminant trap for removing the one or more pollutants from the waste stream received into the reservoir, wherein the contaminant trap is configured to sequester one or more pollutants therein; and wherein the contaminant trap is arranged within the reservoir to drain waste stream therefrom to generate sequestered pollutants that are substantially waste stream free and/or drained of waste stream.

36. A waste stream decontamination system according to clause 35 wherein the at least one solids trap and the at least one contaminant trap are arranged within the reservoir such that when the reservoir is filled with waste stream, the at least one contaminant trap is in contact with the waste stream.

37. A waste stream decontamination system according to clause 35 or clause 36 wherein at least one solids trap and the at least one contaminant trap are positioned relative to each other within the reservoir, such that removal of the solids trap and/or particulate material from the solids trap allows waste stream drainage from the contaminant trap to allow the sequestered pollutants to be removed from the contaminant trap in substantially waste stream free and/or waste stream drained form.

38. A waste stream decontamination system according to any one of clauses 35 to 36 wherein one or more of components of the waste stream decontamination system are coated, lined and/or impregnated with one or more of protective materials and/or substances which preferably include carbon nano composite materials, corrosion resisting materials, including stainless or galvanised steel, or durable plastics such as polyethylene, polypropylene, PTFE, PVC, nylon and/or materials permeable to water, but impermeable to the solids or hydrocarbons/sorbent materials and/or smart materials including antimicrobial materials and/or antifouling materials that prevent undesirable microbial buildup, reduce biological or chemical oxygen demand, or other substances that improve the flow dynamics through the reservoir or traps and/or reduce odours.

39. A waste stream decontamination system according to any one of clauses 35 to 38 where two or more waste stream decontamination system are arranged linearly, in parallel or in an array.

40. A waste stream decontamination system according to any one of clauses 35 to 39 where two or more solids and/or contaminant traps are arrange within the waste stream decontamination system linearly, in parallel or in an array.

41. A kit for retrofitting a waste stream decontamination system, the kit comprising:
(i) at least one solids trap in accordance with the invention, and
(ii) at least one contaminant trap in accordance with the invention, and optionally instructions for retrofitting the waste stream decontamination system.

42. A solid trap comprising at least one one-way valve when used in a method according to any one of clauses 1 to 31.

43. A contaminant trap comprising at least one one-way valve when used in a method according to any one of clauses 1 to 31.

44. Use of one or more contaminant traps in a method of decontaminating waste stream of solid particulate and one or more pollutants, preferable hydrocarbon based pollutants, from a waste stream.
45. Use according to clause 44 wherein the contaminant traps comprises one or more materials for sorbing one or more pollutants from waste stream.
46. Use according to clause 44 or 45 wherein the material is an oleofilic/hydrophobic material, preferably selective for hydrocarbon based pollutants, including fat, oil and grease.
47. Use according to any one of clauses 44 to 46 wherein the material is recyclable.
48. Use according to any one of clauses 44 to 47 wherein the method is as defined in any one of clauses 1 to 31 and/or in a waste stream decontamination system as defined in any one of clauses 35 to 40.
49. Use of a waste stream decontamination system as defined in any one of clauses 35 to 40 in a method of decontaminating waste stream of solid particulate and one or more pollutants contaminants as defined in any one of clauses 1 to 31.
50. Use of one or more pollutant sorbent materials for sorbing one or more pollutants from waste stream in a grease trap and/or interceptor.
51. Use according to clause 49 wherein the grease trap and/or interceptor is as defined in any one of clauses 35 to 40.

The invention claimed is:

1. A system for servicing a grease interceptor for decontaminating a waste stream liquid of solid particulate and one or more hydrocarbon pollutants, the system comprising:
   the grease interceptor comprising:
      at least one reservoir for waste stream to be decontaminated, the reservoir having at least one inlet for receiving the waste stream into the reservoir and at least one outlet for removal of decontaminated waste stream from the reservoir;
      at least one solids trap in direct fluid communication with the at least one inlet for separating solid particulate material from the received waste stream before the waste stream enters into the reservoir;
      at least one hydrocarbon contaminant trap for removing the one or more hydrocarbon pollutants from the waste stream received into the reservoir, wherein the hydrocarbon contaminant trap includes one or more oleophilic sorbent materials for sequestering the one or more hydrocarbon pollutants therein; and
   a vacuum means suitable for removing the solid particulate material from the at least one solids trap and the one or more oleophilic sorbent materials from the hydrocarbon contaminant trap.
2. The system of claim 1 wherein the at least one solids trap is positioned within the reservoir at a level higher than the reservoir floor.
3. The system of claim 1, wherein the reservoir is a single chamber reservoir.
4. The system of claim 1, wherein the sorbent materials are oleophilic and hydrophobic sorbent materials.
5. The system of claim 1 wherein the sorbent material is provided on the liquid surface in the reservoir.
6. A system of claim 1 wherein the one or more oleophilic sorbent materials comprises a single use or a multiple use sorbent material.
7. The system of claim 1 wherein the sequestered pollutants are recovered from the one or more sorbent materials by process involving squeezing and/or pressing the one or more sorbent materials to remove sorbed pollutants.
8. A system according to claim 1 wherein the one or more solids trap and/or the one or more contaminant trap are in the form of a container or receptacle adapted to impede waste stream ingress into the trap while the solids/pollutants are being removed.
9. The system of claim 1 wherein the one or more contaminant trap is provided with a liner for retaining the one or more oleophilic sorbent materials.
10. A method of servicing a grease interceptor for decontaminating a waste stream liquid of solid particulate and one or more hydrocarbon pollutants in a grease interceptor, using a system according to claim 1, wherein servicing the grease interceptor involves the step of:
   removing the solid particulate material from the at least one solids trap by the vacuum means;
   removing the one or more oleophilic sorbent materials and the sequestered hydrocarbon pollutant from the hydrocarbon contaminant trap by the vacuum means;
   recovering one or more hydrocarbon pollutants from the one or more sorbent materials removed from the hydrocarbon contaminant trap by process involving squeezing and/or pressing the one or more oleophilic sorbent materials; and
   optionally, recharging the hydrocarbon contaminant trap with new and/or recycled one or more oleophilic sorbent materials.
11. The method of claim 10, wherein during servicing the solids particulate material and the hydrocarbon pollutants are removed from the reservoir during servicing in a substantially drained form without draining the reservoir entirely of waste stream liquid.
12. A method of decontaminating a waste stream liquid of solid particulate and one or more hydrocarbon pollutants in a grease interceptor, the method comprising the steps of:
   (i) removing solid particulate from the waste stream liquid by passing the waste stream liquid through at least one solids trap into a single chamber waste stream liquid holding reservoir, wherein the solids trap is provided in the direct path of the waste stream as it enters the reservoir such that the waste stream liquid flowing through the at least one inlet of the reservoir flows through the solids trap prior to discharge into the reservoir, whereby solid particulate is retained in the at least one solids trap such that the waste stream liquid entering the reservoir for further treatment is substantially particulate free; and
   (ii) removing one or more hydrocarbon pollutants from the waste stream liquid in the reservoir by contacting the waste stream liquid with at least one hydrocarbon contaminant trap whereby the hydrocarbon contaminant trap includes one or more oleophilic sorbent materials for sequestering the one or more other pollutants within the contaminant trap;
   wherein the interceptor is configured such that the one or more oleophilic sorbent materials and the sequestered hydrocarbon pollutant are removable from hydrocarbon contaminant trap by a vacuum means.
13. The method of claim 12 wherein the vacuum means is adapted to remove the sequestered hydrocarbon pollutant in substantially drained form.
14. The method of claim 12, wherein the waste water stream continuously flows into and out of the reservoir.
15. The method of claim 12, wherein the removing the solid particulate and the sequestered hydrocarbon pollutant from the at least from the traps in substantially drained form by mechanical or manual means involves applying the vacuum means to the traps through one or more openings provided in the reservoir.

16. The method of claim 12, wherein the method further comprises the step of recycling the one or more pollutant sorbent materials by recovering sequestered pollutants from pollutant sorbent materials.

17. The method of claim 16, wherein the sequestered hydrocarbon pollutants are recovered from the one or more sorbent materials by the additional step of squeezing and/or pressing the one or more sorbent materials to remove sorbed pollutants.

18. The method of claim 17, further comprising the step of returning new and/or recycled one or more pollutant sorbent materials to the reservoir and/or the at least one contaminant trap.

19. A grease interceptor adapted for use in a system according to claim 1, wherein the grease interceptor comprises:
  at least one reservoir for waste stream to be decontaminated, the reservoir having at least one inlet for receiving the waste stream into the reservoir and at least one outlet for removal of decontaminated waste stream from the reservoir;
  at least one solids trap in direct fluid communication with the at least one inlet for separating solid particulate material from the received waste stream; and
  at least one hydrocarbon contaminant trap for removing the one or more hydrocarbon pollutants from the waste stream received into the reservoir, wherein the hydrocarbon contaminant trap includes one or more oleophilic sorbent materials for sequestering one or more hydrocarbon pollutants therein.

20. The grease interceptor of claim 19, wherein the reservoir is a single chamber reservoir and/or wherein the at least one solids trap is positioned within the reservoir at a level higher than the reservoir floor.

21. The grease interceptor of claim 19, wherein sorbent materials are oleophilic and hydrophobic sorbent materials.

22. The grease interceptor of claim 21 wherein the sorbent material is provided in a loose form.

23. The system of claim 1 wherein the sorbent material is provided in a loose form.

24. The method of claim 12 wherein the sorbent material is provided in a loose form.

\* \* \* \* \*